US007677035B2

(12) United States Patent
Plougsgaard et al.

(10) Patent No.: US 7,677,035 B2

(45) Date of Patent: Mar. 16, 2010

(54) CONTROL SYSTEM FOR A HYDRAULIC SERVOMOTOR

(75) Inventors: Helge Soe Plougsgaard, Sydals (DK); Ole Ploug, Roedekro (DK)

(73) Assignee: Sauer-Danfoss Aps, Nordborg (DK)

( * ) Notice: Subject to any disclaimer, the term of this patent is extended or adjusted under 35 U.S.C. 154(b) by 231 days.

(21) Appl. No.: 11/703,575

(22) Filed: Feb. 7, 2007

(65) Prior Publication Data

US 2008/0184877 A1 Aug. 7, 2008

(51) Int. Cl.
*F15B 13/08* (2006.01)
*B60R 16/023* (2006.01)

(52) U.S. Cl. .......................................... 60/403; 91/361

(58) Field of Classification Search .................. 60/403, 60/422; 91/6, 31, 361, 388, 457

See application file for complete search history.

(56) References Cited

U.S. PATENT DOCUMENTS

| | | | | | |
|---|---|---|---|---|---|
| 2,569,881 | A | | 10/1951 | Davies | |
| 3,559,536 | A | | 2/1971 | Mason | |
| 4,282,711 | A | | 8/1981 | Branstetter | |
| 4,416,187 | A | * | 11/1983 | Nystrom | 91/361 |
| 4,640,095 | A | | 2/1987 | Engel et al. | |
| 4,870,892 | A | * | 10/1989 | Thomsen et al. | 91/361 |
| 5,165,320 | A | * | 11/1992 | Ravn | 91/459 |
| 5,202,822 | A | * | 4/1993 | McLaughlin et al. | 700/82 |
| 5,299,420 | A | * | 4/1994 | Devier et al. | 60/403 |
| 5,353,685 | A | * | 10/1994 | Snow | 60/403 |
| 5,489,005 | A | * | 2/1996 | Marcott et al. | 180/418 |
| 5,519,636 | A | | 5/1996 | Stoll et al. | |
| 5,743,165 | A | * | 4/1998 | Tanaka et al. | 91/454 |
| 5,868,059 | A | * | 2/1999 | Smith | 91/454 |
| 5,960,695 | A | * | 10/1999 | Aardema et al. | 91/454 |
| 6,131,391 | A | * | 10/2000 | Poorman | 91/454 |
| 6,626,082 | B2 | * | 9/2003 | Morita et al. | 91/465 |
| 6,637,199 | B2 | | 10/2003 | Spickard | |
| 6,662,556 | B2 | * | 12/2003 | Bares et al. | 60/422 |
| 6,748,738 | B2 | | 6/2004 | Smith | |

(Continued)

FOREIGN PATENT DOCUMENTS

DE 92 11 109.2 U1 10/1992

(Continued)

OTHER PUBLICATIONS

Co-pending U.S. Appl. No. 11/703,431 entitled "A Hydraulic Actuator Having An Auxiliary Valve" filed Feb. 7, 2007.

(Continued)

*Primary Examiner*—Thomas E Lazo

(74) *Attorney, Agent, or Firm*—McCormick, Paulding & Huber LLP

(57) ABSTRACT

A control system for a hydraulic servomotor (13) is disclosed. The control system comprises an electro hydraulic actuator (2) comprising a number of valves (9, 10, 11, 12, 18) for controlling fluid flows, a main control module (1), and one or more connectors. The control system further comprises at least one extension control module (3) comprising one or more connectors. Finally, the control system comprises means (6) for communicating signals between the main control module (1) and each of the extension control module(s) (3). Since the main control module (1) and the extension control module(s) (3) are able to communicate signals, it is possible to provide signals to/from the main control module (1) via an extension module (3), thereby in effect providing additional connectors to the main control module (1). Thereby the main control module (1) may be able to perform additional functions as compared to similar prior art control modules.

17 Claims, 7 Drawing Sheets

U.S. PATENT DOCUMENTS

| | | | | |
|---|---|---|---|---|
| 7,380,398 | B2 | 6/2008 | Pfaff | |
| 2004/0196003 | A1 * | 10/2004 | Graff et al. | 320/116 |
| 2006/0136101 | A1 * | 6/2006 | Spengler | 701/2 |

FOREIGN PATENT DOCUMENTS

| | | | |
|---|---|---|---|
| DE | 4312757 | A1 | 10/1994 |
| DE | 44 31 103 | A1 | 3/1996 |
| DE | 102005013823 | A1 | 11/2005 |
| EP | 1 403 129 | A2 | 3/2004 |
| EP | 1700728 | A2 | 9/2006 |
| WO | 9607029 | A | 3/1996 |
| WO | 2005077731 | A1 | 8/2005 |
| WO | 2005078318 | A1 | 8/2005 |
| WO | 2006102906 | A2 | 10/2006 |

OTHER PUBLICATIONS

Co-Pending U.S. Appl. No. 11/703,430 entitled "A Valve Assembly and A Hydraulic Actuator Comprising The Valve Assembly" filed Feb. 7, 2007.

Co-pending U.S. Appl. No. 11/703,314 entitled "A Hydraulic Actuator For A Servomotor With an End Lock Function" filed Feb. 7, 2007.

International Search Report for Serial No. PCT/DK2008/000058 dated May 16, 2008.

International Search Report for Serial No. PCT/DK2008/000059 dated May 9, 2008.

International Search Report for Serial No. PCT/DK2008/000060 dated May 9, 2008.

International Search Report for Serial No. PCT/DK2008/000061 dated May 14, 2008.

* cited by examiner

CONTROL SYSTEM FOR A HYDRAULIC SERVOMOTOR

CROSS REFERENCE TO RELATED APPLICATIONS

This application discloses similar subject matter as disclosed in co-pending application Ser. No. 11/703,431 entitled "A Hydraulic Actuator Having An Auxiliary Valve"; co-pending application Ser. No. 11/703,430 entitled "A Valve Assembly and A Hydraulic Actuator Comprising the Valve Assembly"; and co-pending application Ser. No. 11/703,314 entitled "A Hydraulic Actuator For A Servomotor With an End Lock Function" all assigned to the same Assignee and filed on the same date herewith.

FIELD OF THE INVENTION

The present invention relates to a control system for a hydraulic servomotor. More particularly, the present invention relates to a control system as defined above in which it is possible to allow the control system to perform additional functions as compared to similar prior art control system. Thereby it may even be possible to avoid the need for an external controller.

BACKGROUND OF THE INVENTION

Prior art electrical control systems for hydraulic servomotors typically comprise a controller for controlling electrical activation of, e.g., valves of the control system. Furthermore, an external controller positioned in the hydraulic system, or possibly in a vehicle in which the hydraulic system is positioned, is typically necessary in order to obtain all of the functionalities which are desired.

Examples of prior art control systems are, e.g., disclosed in U.S. Pat. No. 4,870,892, U.S. Pat. No. 5,165,320 and DE 44 31 103.

It may sometimes be desirable to allow some or all of these additional functionalities to be performed directly by the controller of the control system. However, this would require additional electrical connections to/from the controller, e.g. in order to allow input from a sufficient number of sensor devices measuring relevant control parameters. However, the number of available electrical connections, e.g. pins, is limited due to the size of the actuator and to strict requirements to mechanical robustness of the connector. It is therefore not necessarily expedient to increase the number of available electrical connections to a desired level.

SUMMARY OF THE INVENTION

It is, thus, an object of the invention to provide a control system for a hydraulic servomotor, the control system being allowed to perform additional functionalities as compared to similar prior art control systems.

It is a further object of the invention to provide a control system for a hydraulic servomotor, the control system providing the possibility of avoiding the need for an external controller for controlling the hydraulic servomotor.

According to the invention the above and other objects are fulfilled by providing a control system for a hydraulic servomotor, the control system comprising:

an electro hydraulic actuator comprising a number of valves for controlling fluid and a main control module adapted to supply control signals to at least some of said valves, thereby controlling the fluid, and comprising one or more connectors for receiving and/or transmitting signals, at least one extension control module comprising one or more connectors for receiving and/or transmitting signals, and means for communicating signals between the main control module and each of the extension control module(s) via said connectors.

The hydraulic servomotor may be of a linearly moving kind, e.g. comprising a piston slidably arranged in a cylinder. As an alternative, it may be of a rotatably moving kind, e.g. comprising a member rotatably arranged in a housing. As another alternative, it may be of a kind comprising two linearly moving pistons, e.g. with a pressure chamber at one end of each piston and attached to a swash plate rotating about a trunnion.

In the present context the term 'controlling fluid' may be interpreted as controlling fluid pressure, fluid flow or any other suitable fluid parameter.

The connectors of the main control module and/or the connectors of the extension control module may be electric, optic, magnetic, and/or they may be any other suitable kind of connectors adapted to transmit and/or receive a relevant signal. Each connector may be adapted to transmit signals only, or to receive signals only, or to transmit as well as receive signals.

The connectors may comprise a number of connector pins, e.g. arranged in a housing.

The signals may, e.g., be control signals, sensor signals generated by one or more relevant sensors, electric signals, and the signals may be transmitted in a wired or a wireless manner, e.g. using radio frequency (RF) signals, and/or any other suitable kind of signal adapted to convey desired information.

It is an advantage that the main control module and each of the extension control module(s) can communicate with each other, because the connectors of an extension control module can thereby be used for supplying signals to/from the main control module. For instance, sensor signals generated by two or more relevant sensors may be supplied to two or more connector pins of an extension control module. All of these signals may be communicated further to the main control module via a connector of the extension control module and a connector of the main control module, and by means of the means for communicating signals. Thereby signals generated by two or more different sensors are supplied to the main control module using only a single connector of the main control module. Thus, it is possible to supply additional signals to/from the main control module as compared to the situation where no extension control module was present. This opens the possibility of allowing the control system to perform additional functionalities as compared to similar prior art control systems. This may even have the consequence that an external controller is no longer necessary because the control system will be able to perform the functionalities which are normally performed by an external controller. Thus, an extension control module may comprise valve controls and/or application controls which would normally be comprised in an external controller.

According to one embodiment at least one extension control module may form part of a second electro hydraulic actuator. In this case the extension control module may advantageously function as a 'main control module' of the second electro hydraulic actuator. The second electro hydraulic actuator may advantageously comprise a number of valves for controlling fluid flows. The second electro hydraulic actuator may, thus, be similar to or identical to the electro hydraulic actuator described above and comprising the main control module. In this case, the extension control module may be similar to or identical to the main control module.

Thus, the extension control module(s) forming part of a second electro hydraulic actuator may be adapted to provide redundant control of the hydraulic servomotor. In this case the electro hydraulic actuator comprising the main control module and the second electro hydraulic actuator may both be fluidly connected to the hydraulic servomotor in such a manner that fluid flows to and from the hydraulic servomotor may be controlled by means of either of the electro hydraulic actuators and/or by the two hydraulic actuators in combination. In the case that one of the electro hydraulic actuators fails, the other one may continue operating the hydraulic servomotor, which will thereby remain operational. Failure of an electro hydraulic actuator may, e.g., be due to an electrical failure of an associated control module and/or it may be due to failure, e.g. mechanical failure, of one or more valves, e.g. as a result of fouling of the valve(s). This reduces the risk that the hydraulic servomotor becomes in-operational. Furthermore, the extension control module may in this case carry application software from a machine having the hydraulic servomotor installed therein. This is very cost attractive, since a separate machine controller may thereby be omitted.

Two or more extension control modules may form part of an additional electro hydraulic actuator as described above. In this case each of these extension control modules may advantageously be adapted to provide redundant control of the hydraulic servomotor. This even further reduces the risk that the hydraulic servomotor becomes in-operational.

As an alternative, each of the extension control modules may be pure electronic modules, i.e. none of the extension control modules forms part of an electro hydraulic actuator. In this case the extension control modules may be used purely for providing additional connector possibilities to the main control module.

At least one extension control module may be identical to the main control module. In this case the extension control module may form part of a second electro hydraulic actuator as described above. Alternatively, the extension control module may simply be identical to the main control module, possibly provided with a back plate in a position where an interface to the valves is normally arranged. From a manufacturing point of view it is an advantage that at least one extension control module is identical to the main control module, because this allows the possibility of manufacturing only one kind of control module and apply this for main control module as well as for extension control module.

The main control module and the extension control module(s) may form a master/slave configuration in which the main control module acts as master module and the extension control module(s) act(s) as slave module(s). According to this embodiment the main control module (master) may directly drive or control valves associated with the extension control module (slave). This provides the possibility of omitting a position transducer in the extension control module, the possibility of reserving most possible space for application software in the extension control module, and the possibility of allowing application software to perform independently of position control software of the control modules.

The means for communicating signals may comprise a bus connection, such as a CanBus. Alternatively or additionally, the means for communicating signals may comprise any other suitable kind of means, such as one or more wires and/or one or more wireless connections. The signals communicated between the main control module and the extension control module(s) may be in analog or digital form.

The hydraulic servomotor may comprise a cylinder and a double acting piston slidably mounted in the cylinder and defining a first chamber and a second chamber in the cylinder, said piston being slidably movable in a first direction in response to a supply of fluid to the first chamber, and in an opposite second direction in response to a supply of fluid to the second chamber, said fluid flows being controlled by means of the valves. According to this embodiment the position of the piston in the cylinder is controlled by opening and closing the valves, thereby providing fluid flows to the first and second chambers, and thereby the hydraulic servomotor is controlled. In this case the hydraulic servomotor is a sliding member, i.e. it is of a linearly operating kind.

As an alternative, the hydraulic servomotor may be of any other suitable kind, e.g. of a rotatably operating kind. An example of a rotatably operating hydraulic servomotor is a servomotor comprising two chambers arranged in a housing and being divided by a rotating member. The rotating member may in this case be rotatably movable in response to fluid flow to either of the chambers.

As another alternative, the hydraulic servomotor may be of the a kind having two linearly moving pistons with a pressure chamber at one end of each piston and attached to a swash plate rotating about a trunnion.

The hydraulic actuator may comprise four valves arranged in a bridge circuit, the hydraulic servomotor being arranged between diagonals of the bridge circuit. According to this embodiment the hydraulic servomotor is preferably of a kind defining two chambers, and in this case the hydraulic servomotor may advantageously be arranged in the bridge circuit in such a manner that a first valve is fluidly connected between a pump and a first chamber, a second valve is fluidly connected between the first chamber and a fluid drain, a third valve is fluidly connected between the pump and a second chamber, and a fourth valve is fluidly connected between the second chamber and the fluid drain. Thereby, opening and closing the valves in an appropriate manner will result in desired fluid flow to and from the chambers.

One or more of the valves may be an electrically operable valve, such as a solenoid valve. In this case at least some of the valves may be normally closed in a de-energized state. Preferably all of the valves are normally closed in a de-energized state. This configuration is particularly suitable for vehicle applications, in which the hydraulic servomotor operates the position of a swash plate, the angular position of the swash plate determining the stroke volume of a motor or a pump. In the configuration where each of the valves is of the normally closed kind, all of the valves will close in the case of a power cut off. Accordingly, fluid flow to and from the chambers is instantaneously prevented in the case of a power cut off. Thereby the position of the hydraulic servomotor, and hence the angular position of the swash plate, is instantaneously locked. As a consequence, the instantaneous stroke volume of the motor or pump will be maintained. In the present context the term ‘locked’ should be interpreted to mean hydraulically locked or held, rather than mechanically locked.

However, other kinds of valves may be used in the bridge circuit. Thus, one or more of the valves may be an electrically operated valve, such as a solenoid valve which is normally open in a de-energized state, and/or one or more of the valves may be a check valve, and/or any other suitable kind of valve may be used. The choice of valves at each of the positions of the bridge circuit will depend on the specific application of the hydraulic servomotor.

The control system may further comprise at least one additional valve arranged in parallel to one of the valves forming the bridge circuit. This additional valve may also be an electrically operable valve, such as a solenoid valve, e.g. of a kind which is normally closed in a de-energized state. This provides the possibility of adapting the flow capacity of the control system to a desired level.

Alternatively or additionally, the control system may further comprise at least four additional valves arranged in at least one additional bridge circuit, said additional bridge circuit being arranged in parallel with the first bridge circuit. The additional bridge circuit may be adapted to provide redundant control of the hydraulic servomotor as described above.

The hydraulic actuator may comprise at least one additional hydraulic servomotor being arranged between diagonals of a bridge circuit. The hydraulic servomotors are preferably mechanically linked. According to this embodiment, two or more servomotors may be applied in order to obtain a desired level of output force from the system, replacing one larger servomotor providing the same level of output force. Using the smaller servomotors provides a more flexible system in the sense that the smaller servomotors may be easier fitted into the desired application than one larger servomotor.

At least one valve may be driven by a pulse train signal. All of the valves may be driven by one or more pulse train signals, or some of the valves may be driven by one or more pulse train signals, while other valves are not. Alternatively, all of the valves may be driven in any other suitable manner.

The valves may be controlled by means of a closed loop control of the hydraulic servomotor. The closed loop control may, e.g., be based on position of the servomotor, e.g. linear position or angular position, pressure in the chambers and/or on any other suitable parameter.

Thus, the hydraulic actuator may further comprise at least one sensor, said sensor(s) being adapted to provide an input signal to the closed loop control. Suitable sensors may, e.g., be position sensors, such as linear variable displacement transducers (LVDT), pressure sensors, temperature sensors, flow sensors, etc.

The control system according to the present invention may suitably be used in a hydro-mechanical transmission (HMT), e.g. for an all terrain vehicle or a work utility vehicle, or in an electro hydraulic steering application, or in any other suitable application.

BRIEF DESCRIPTION OF THE DRAWINGS

The invention will now be described in further detail with reference to the accompanying drawings in which.

DETAILED DESCRIPTION OF THE INVENTION

Figure 1:
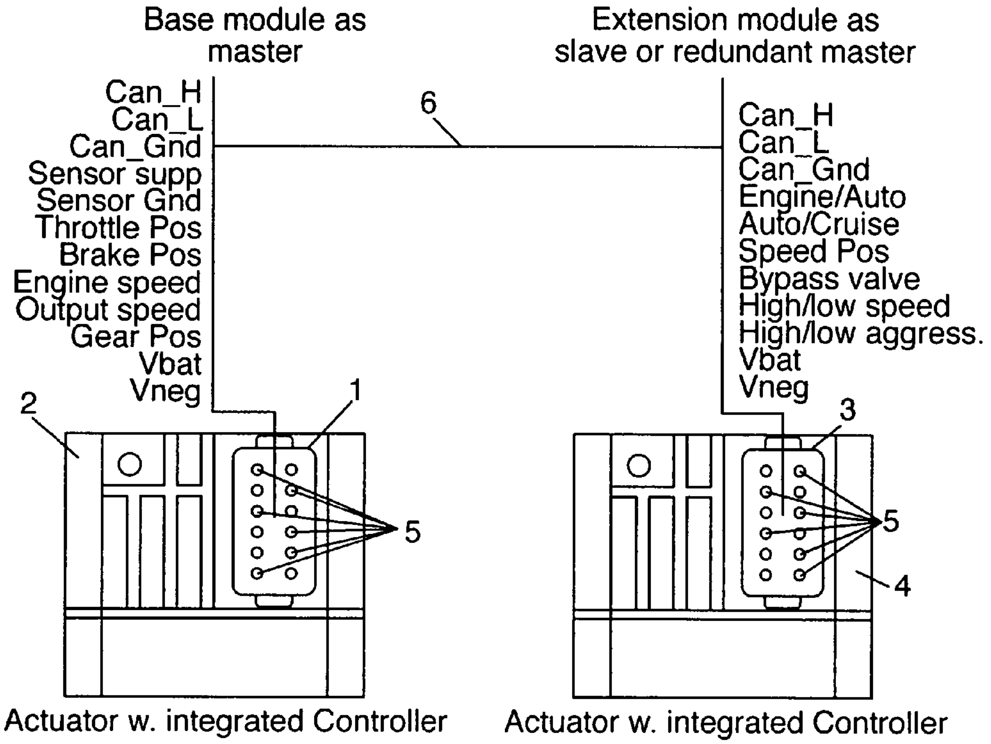
FIG. 1 illustrates a control system according to a first embodiment of the invention and comprising an extension control module forming part of an electro hydraulic actuator.

FIG. 1 illustrates a control system according to a first embodiment of the invention. The control system of FIG. 1 comprises a main control module 1 forming part of a first electro hydraulic actuator 2. The control system further comprises an extension control module 3 forming part of a second electro hydraulic actuator 4. It is clear from FIG. 1 that the main control module 1 and the extension control module 3 are identical.

The main control module 1 and the extension control module 3 each comprises one connector having a number of connector pins 5. Via the connector pins 5 signals may be communicated to and from the control modules 1, 3, including signals communicated between the main control module 1 and the extension control module 3.

The connector pins 5 of the main control module 1 are adapted to transmit/receive signals relating to high, low and ground setting of a CanBus 6 arranged between the main control module 1 and the extension control module 3, sensor signals, throttle position, brake position, engine speed, output speed, gear position, battery voltage and negative voltage.

The connector pins 5 of the extension control module 3 are adapted to transmit/receive signals relating to high, low and ground settings of the CanBus 6, engine/auto, auto/cruise, speed position, bypass valve, high/low speed, high/low aggressiveness, battery voltage and negative voltage.

A signal received via the connector of one control module 1, 3 may be communicated to the other control module 3, 1 via the CanBus 6. For instance, a throttle position may be measured and communicated to the main control module 1, and then communicated to the extension control module 3 via the CanBus 6 and used as a control parameter when controlling the second electro hydraulic actuator 4. Thereby additional connector pins 5 have been provided for the control modules 1, 3.

Figure 2:
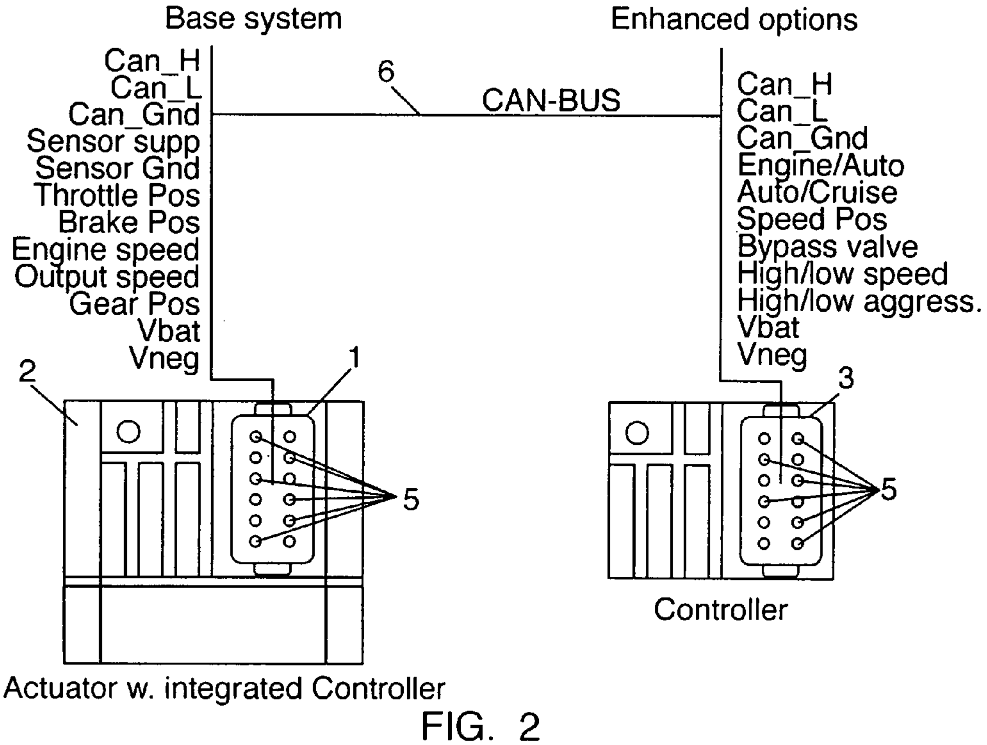
FIG. 2 illustrates a control system according to a second embodiment of the invention and comprising an extension control module which does not form part of an electro hydraulic actuator.

FIG. 2 illustrates a control system according to a second embodiment of the invention. The control system illustrated in FIG. 2 is very similar to the control system illustrated in FIG. 1. However, in FIG. 2 the extension control module 3 does not form part of an electro hydraulic actuator. Thus, in this case the extension control module 3 merely provides additional connector pins 5 for the main control module 1, i.e. the extension control module 3 does not in itself control an electro hydraulic actuator.

Figure 3:
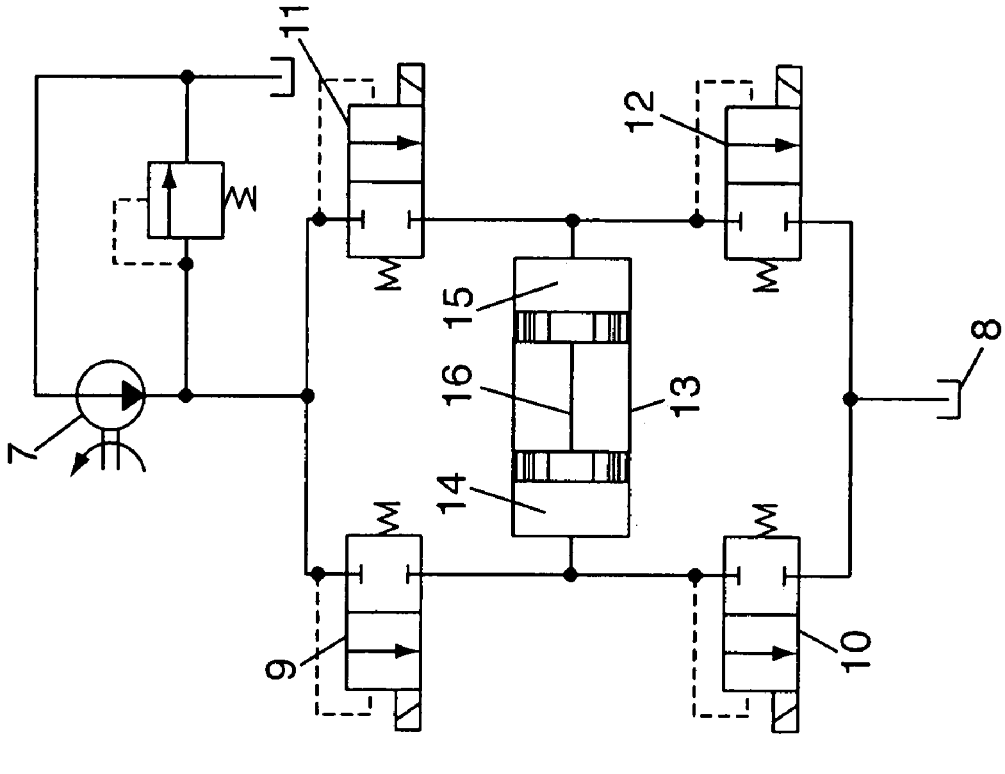

FIG. 3 is a schematic diagram illustrating a hydraulic actuator which may be applied in control systems according to the invention. The hydraulic actuator comprises a valve assembly connected between a fluid source in the form of a pump 7 and a fluid drain in the form of a tank 8. The hydraulic actuator comprises four valves 9, 10, 11, 12 arranged in a bridge circuit. A hydraulic servomotor 13 is arranged between diagonals of the bridge circuit, the hydraulic servomotor 13 defining a first chamber 14 and a second chamber 15. Thus, a first valve 9 is fluidly connected between the pump 7 and the first chamber 14, a second valve 10 is fluidly connected between the first chamber 14 and the tank 8, a third valve 11 is fluidly connected between the pump 7 and the second chamber 15, and a fourth valve 12 is fluidly connected between the second chamber 15 and the tank 8. Thus, opening and closing the valves 9, 10, 11, 12 in an appropriate manner will result in a desired fluid flow to/from the chambers 14, 15, and thereby a desired position of piston member 16 is obtained.

The valves 9, 10, 11, 12 are all of a kind which is normally closed in a de-energized state. Accordingly, in the case of a power cut off, all of the valves 9, 10, 11, 12 will immediately close, thereby preventing fluid flow to and from both of the chambers 14, 15. As a consequence the piston member 16 is instantaneously locked in its immediate position. This has already been described above.

Figure 4:
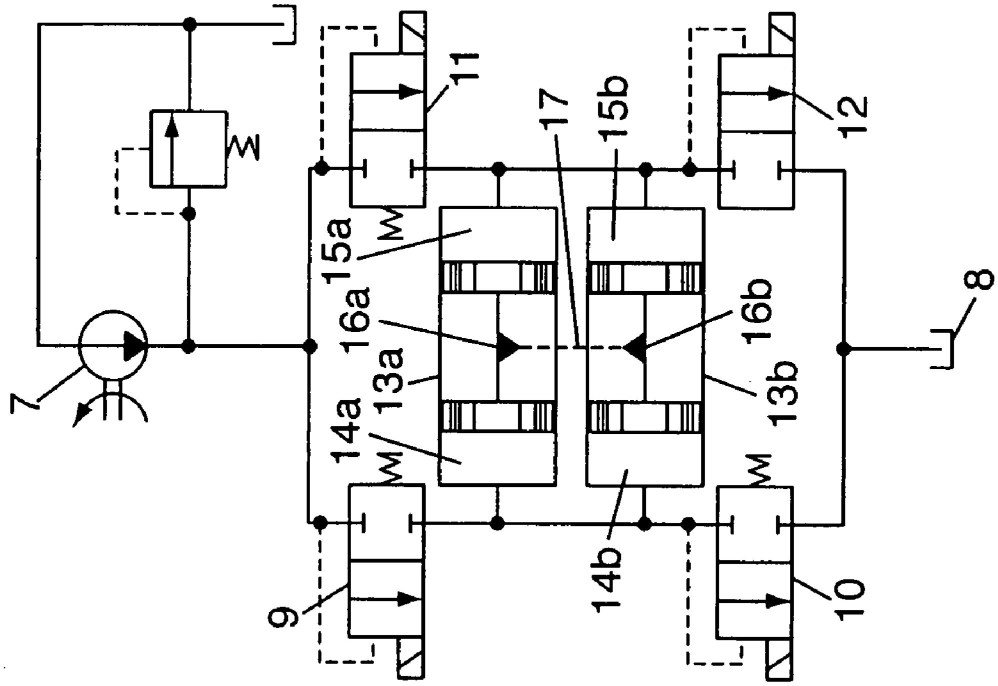
FIGS. 3-9 are schematic diagrams illustrating various embodiments of hydraulic actuators which may be applied in control systems according to the invention.

FIG. 4 is a schematic diagram of another hydraulic actuator which may be applied in control systems according to the invention. The hydraulic actuator of FIG. 4 is very similar to the hydraulic actuator of FIG. 3, and parts which have already been described above will therefore not be described in detail here.

The difference between the hydraulic actuator of FIG. 3 and the hydraulic actuator of FIG. 4 is that the hydraulic actuator of FIG. 4 comprises two hydraulic servomotors 13*a*, 13*b*, each defining a first chamber 14*a*, 14*b* and a second chamber 15*a*, 15*b*. Both of the hydraulic servomotors 13*a*, 13*b* are fluidly connected between diagonals of the bridge circuit formed by the valves 9, 10, 11, 12.

The piston members 16*a*, 16*b* of the hydraulic servomotors 13*a*, 13*b* are mechanically interconnected by means of connecting member 17. Such an arrangement may be used for providing balancing of forces in the system. Furthermore, the two hydraulic servomotors 13*a*, 13*b* may replace one larger servomotor providing the same output force level as the combined output force level of the two hydraulic servomotors 13*a*, 13*b*, thereby providing a system which may more easily be fitted into a desired application.

Figure 5:
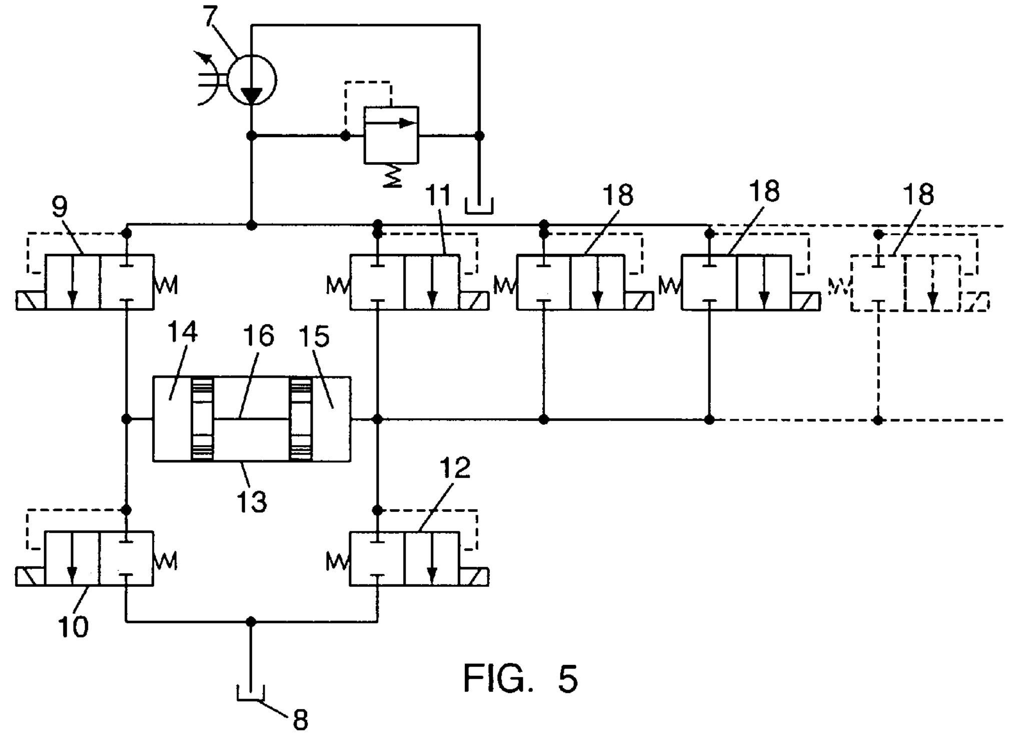

FIG. 5 is a schematic diagram of yet another hydraulic actuator which may be applied in control systems according to the invention. The hydraulic actuator of FIG. 5 is very similar to the hydraulic actuator of FIG. 3, and parts which have already been described above will therefore not be described in detail here.

The difference between the hydraulic actuator of FIG. 3 and the hydraulic actuator of FIG. 5 is that the hydraulic actuator of FIG. 5 further comprises a number of additional valves 18 arranged in parallel with the third valve 11 of the bridge circuit. The dotted line indicates that even further additional valves 18 may be added. As mentioned above, this configuration allows the flow capacity of the system to be adapted to a specific desired level.

The additional valves 18 are all of the kind which is normally closed in a de-energized state. Thus, in the case of a power cut off the hydraulic actuator of FIG. 5 will function as the hydraulic actuator of FIG. 3, i.e. as described above.

It should be noted that additional valves 18 could alternatively or additionally be arranged in parallel with one or more of the other valves 9, 10, 12 of the bridge circuit in order to obtain a similar result. It should also be noted that it would also be possible to adapt the flow capacity of the system by replacing the third valve 11 and the additional valves 18 by one valve having a desired (larger) flow capacity.

Figure 6:
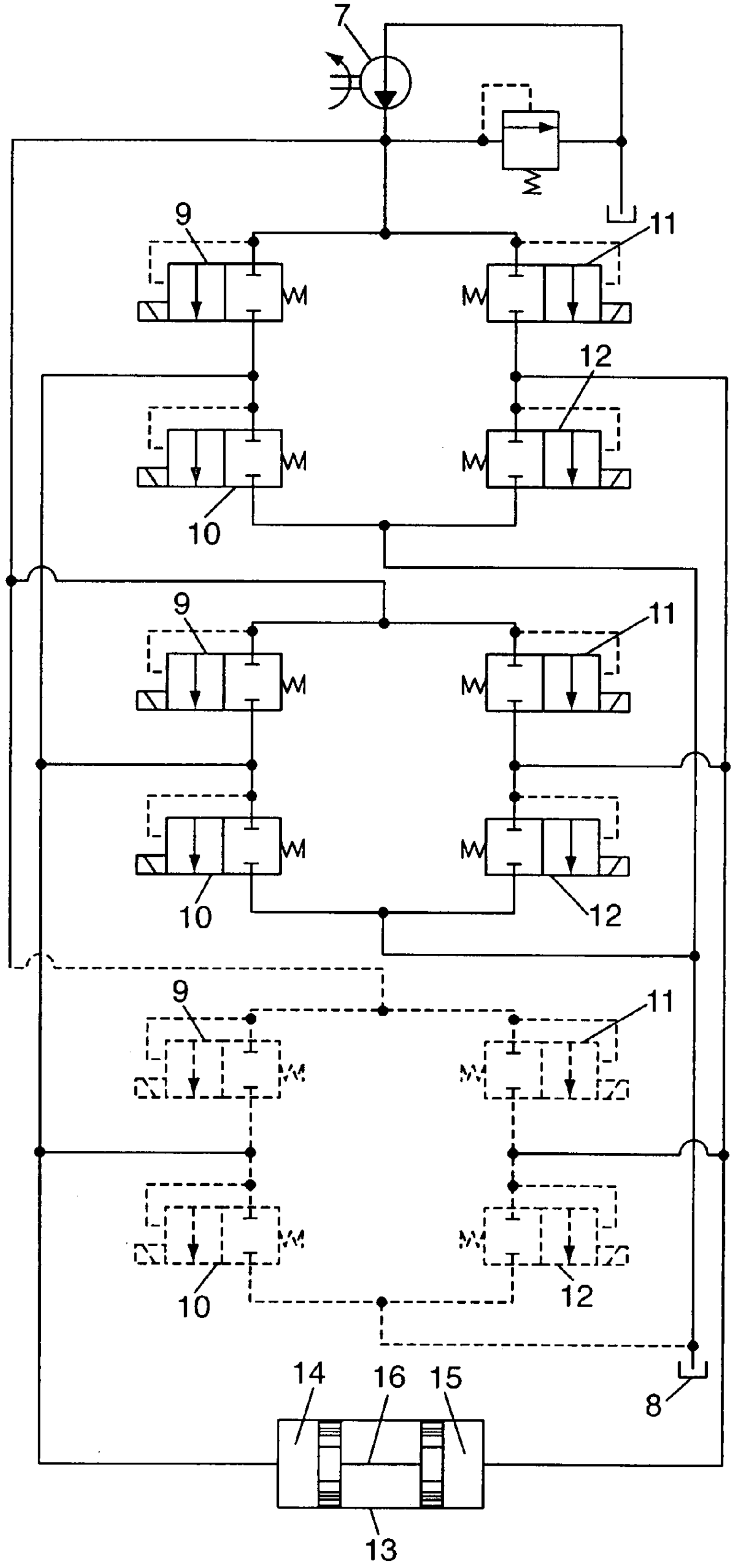

FIG. 6 is a schematic diagram of yet another hydraulic actuator which may be applied in control systems according to the invention. The hydraulic actuator of FIG. 6 comprises a number of bridge circuits identical to the bridge circuit described with reference to FIG. 3. The bridge circuits are fluidly connected in parallel to the hydraulic servomotor 13 in such a manner that they are all adapted to control fluid flows to/from the chambers 14, 15 as described above with reference to FIG. 3. Thereby the bridge circuits may provide redundancy of the electro hydraulic actuator in the sense that if one of the bridge circuits fails, e.g. because one or more valves fail, the remaining bridge circuits will continue to operate, thereby ensuring operation of the hydraulic servomotor 13.

The dotted line indicates that even further bridge circuits may be added in order to obtain a desired flow capacity.

Figure 7:
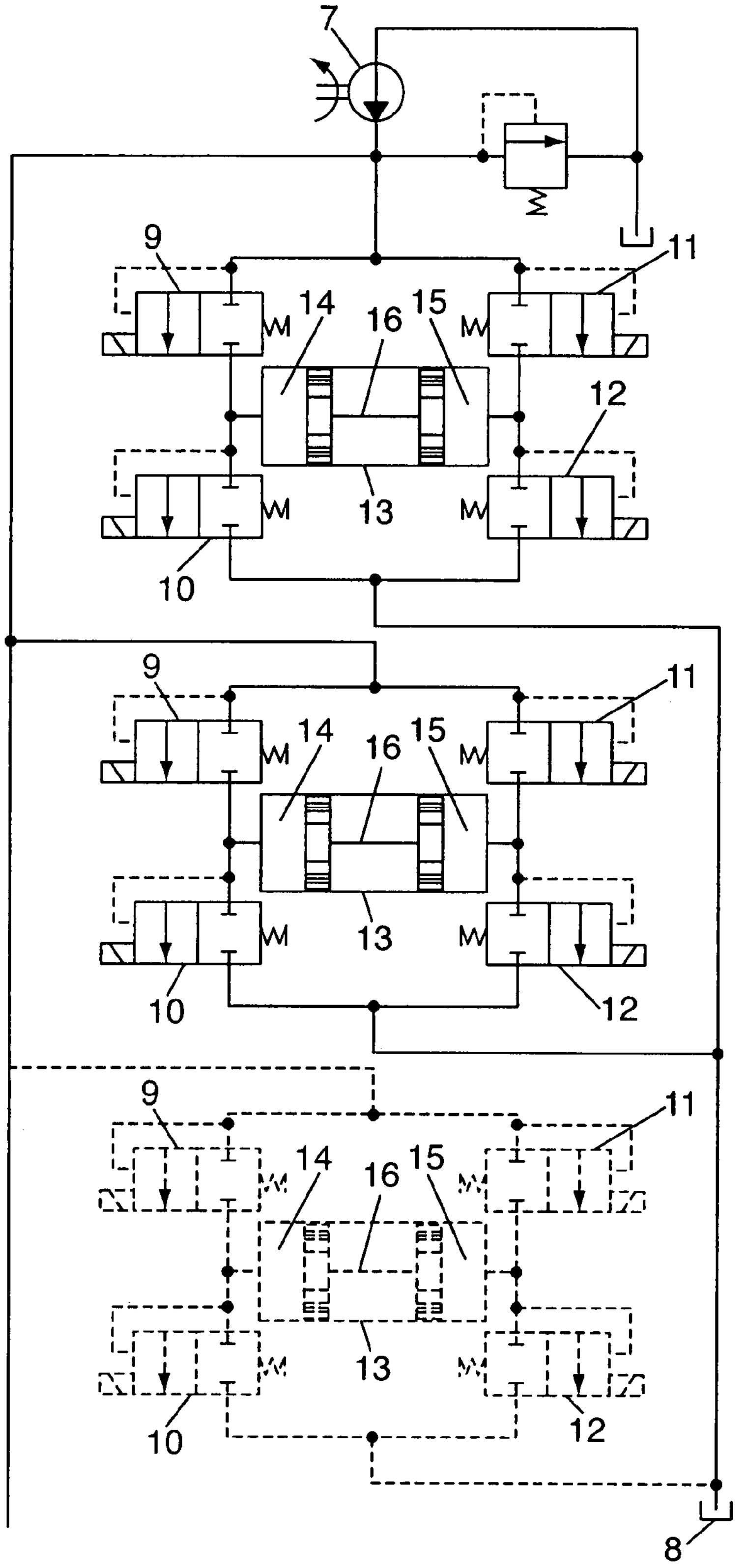

FIG. 7 is a schematic diagram illustrating yet another hydraulic actuator which may be applied in control systems according to the invention. The hydraulic actuator of FIG. 7 is composed of a number of hydraulic actuators identical to the one illustrated in FIG. 3. The actuators are arranged in parallel. This configuration provides redundancy of the system in the case that a failure occurs on one of the servomotors 13, and in the case that all of the servomotors 13 are hydraulically coupled to the same application, e.g. the servomotors 13 being spools of hydraulic spool valves which are coupled to one common cylinder. As an alternative, the hydraulic servomotors 13 may each be coupled to an individual cylinder, each cylinder performing an individual task.

Figure 8:
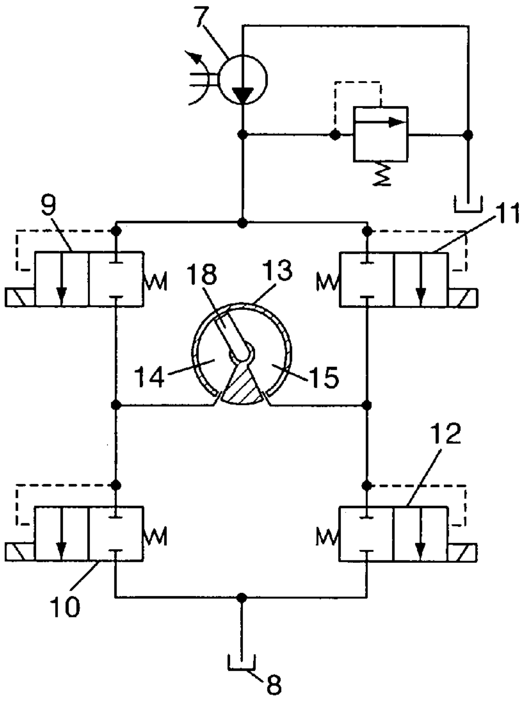

FIG. 8 is a schematic diagram of yet another hydraulic actuator which may be applied in control systems according to the invention. The hydraulic actuator of FIG. 8 is very similar to the hydraulic actuator of FIG. 3, and parts which have already been described above will therefore not be described in detail here.

The difference between the hydraulic actuator of FIG. 3 and the hydraulic actuator of FIG. 8 is that the servomotor 13 shown in FIG. 8 is of a rotatable kind. The servomotor 13 comprises a first chamber 14 and a second chamber 15, the chambers 14, 15 being fluidly connected to the valves 9, 10, 11, 12 as described above. However, in this case the chambers 14, 15 are divided by a rotating member 18. Thus, opening and closing the valves 9, 10, 11, 12 in an appropriate manner will, in this case, result in a desired fluid flow to/from the chambers 14, 15, and thereby a desired angular position of the rotating member 18 is obtained.

In the case of a power cut off, all of the valves 9, 10, 11, 12 will immediately close as described above. Thereby fluid flow to and from both of the chambers 14, 15 is prevented, and the rotating member 18 is consequently instantaneously locked in its immediate angular position.

Figure 9:
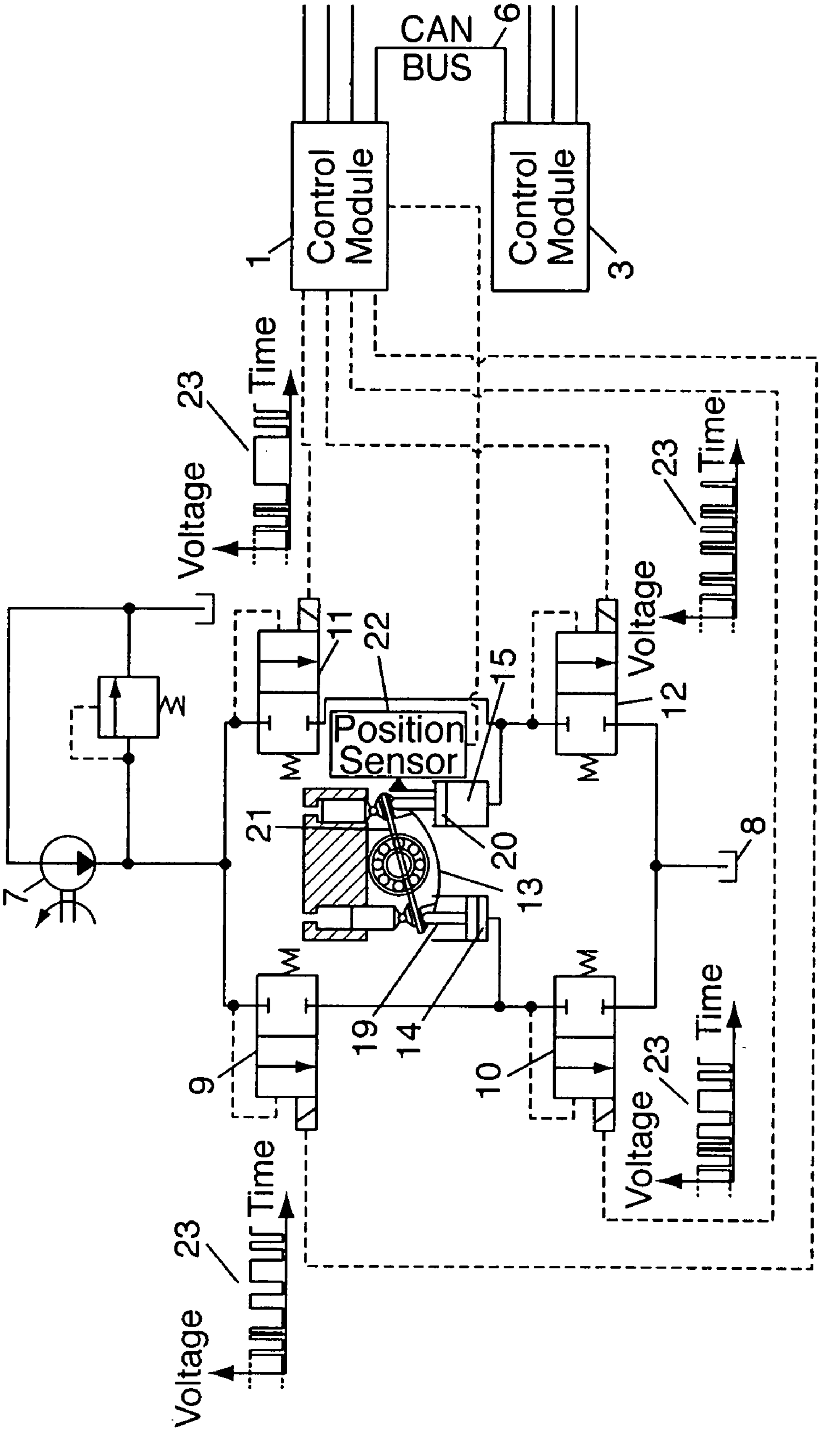

FIG. 9 is a schematic diagram of yet another hydraulic actuator which may be applied in control systems according to the invention. The hydraulic actuator of FIG. 9 is very similar to the hydraulic actuator of FIG. 3, and parts which have already been described above will therefore not be described in detail here.

The difference between the hydraulic actuator of FIG. 3 and the hydraulic actuator of FIG. 9 is that the servomotor 13 shown in FIG. 9 is of a kind having two linearly moving pistons 19, 20. Each of the linearly moving pistons 19, 20 has a chamber 14, 15, the chambers 14, 15 being fluidly connected to the valves 9, 10, 11, 12 as described above. The linearly moving pistons 19, 20 are attached to a swash plate 21 in such a manner that the angular position of the swash plate 21 is determined by the positions of the linearly moving pistons 19, 20. Thus, in this case, opening and closing the valves 9, 10, 11, 12 in an appropriate manner will result in a desired fluid flow to/from the chambers 14, 15. This will result in desired positions of the linearly moving pistons 19, 20, and thereby in a desired angular position of the swash plate 21.

In the case of a power cut off, all of the valves 9, 10, 11, 12 will immediately close as described above. Thereby fluid flow to and from both of the chambers 14, 15 is prevented, and the swash plate 21 is consequently instantaneously locked in its immediate angular position.

FIG. 9 further illustrates how the main control module 1 and the extension control module 3 are connected to the servomotor 13. The hydraulic actuator comprises a sensor 22 measuring the position of one of the linearly moving pistons 20, and thereby the position of the swash plate 21. The measured position is supplied to the main control module 1, and based on this, the main control module 1 controls the valves 9, 10, 11, 12 by means of pulse train signals 23 supplied to each of the valves 9, 10, 11, 12. Thus, the valves 9, 10, 11, 12 shown in FIG. 9 are controlled by means of a closed loop control of the servomotor 13.

Figure 10:
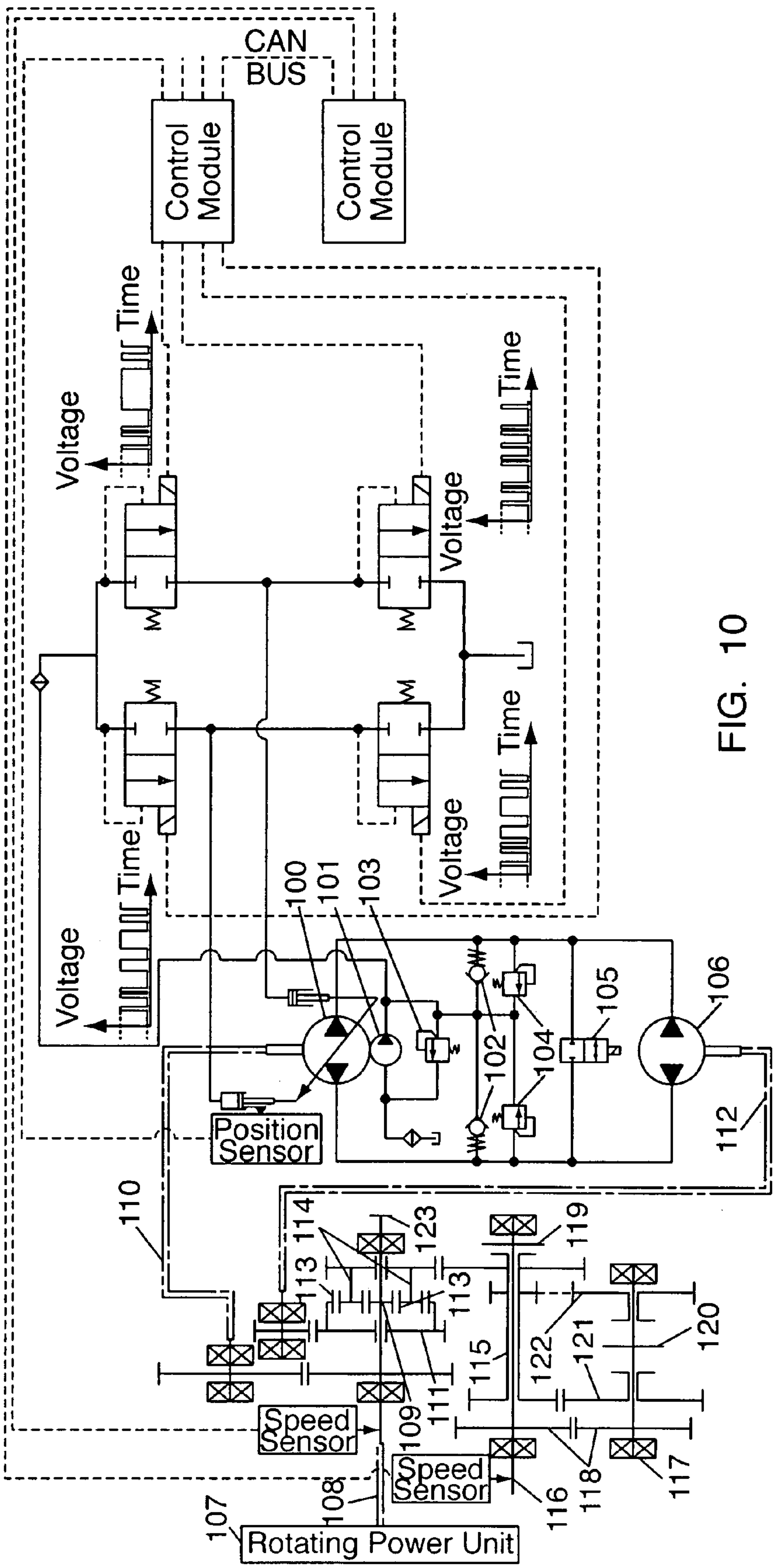
FIG. 10 is a schematic diagram illustrating use of a hydraulic actuator in a hydro-mechanical transmission (HMT).

FIG. 10 is a schematic diagram illustrating use of a hydraulic actuator in a hydro-mechanical transmission (HMT). The valve arrangement of the hydraulic actuator is identical to the one shown in FIG. 3, and it will therefore not be described here.

By metering flow into and out of the two chambers the displacement volume of a variable displacement unit 100 is varied. A charge pump 101 supplies the electro hydraulic actuator with fluid in addition to refilling two branches of the hydraulic main circuit through refill valves 102. A supply pressure relief valve 103 controls the pressure at the outlet of the charge pump 101. Pressure relief valves 104 protect the hydraulic main circuit against overpressure. By bypass valve 105 the two branches of the hydraulic main circuit may be partially or fully connected, thus bypassing a fixed displacement unit 106. For example, this gives the ability to rotate the fixed displacement unit 106 without the variable displacement unit 100 rotating, and visa versa. In the following description it is assumed that the bypass valve 105 is closed.

A rotating power unit 107, for example an internal combustion engine or an electrical motor, is driving an input shaft 108. The angular rotation speed of the input shaft 108 is the same as the angular rotation speed of sun gear 109, since they are connected. A gear drive from input 110 is connecting the input shaft 108 to the variable displacement unit 100. By varying the displacement volume of the variable displacement unit 100 the angular velocity of the fixed displacement unit 106 is varied. The fixed displacement unit 106 is connected to a ring gear 111 of an epicyclic gear train through gear drive to planetary gear 112. Consequently the angular velocity of the fixed displacement unit 106 and the angular velocity of the ring gear 111 are connected at a fixed ratio. As an alternative to the gear arrangement shown in FIG. 10, a gear arrangement of the kind disclosed in WO 2006/102906 could be used.

The relative angular velocities of the sun gear 109 and the ring gear 111 decide the angular velocities of the planet gears 113 and thus the angular velocity of the planet carrier 114. The planet carrier 114 drives a gear shaft 115 which is concentric with a first output shaft 116. The first output shaft 116 and a second output shaft 117 are linked through a first gear set 118 and their angular velocities are therefore at a fixed ratio. When all dog rings 119, 120 are disengaged the output shafts 116, 117 can rotate freely compared to the planet carrier 114. When engaging the first dog ring 119 with the gear shaft 116, the gear ratio from the planet carrier 114 to the output shafts 116, 117 is fixed at a first ratio. If engaging the first dog ring 119 with the bearing, the first output shaft 116 will be locked (vehicle park). If instead engaging the second dog ring 120 with a second gear set 121, the gear ratio from the planet carrier 114 to the output shafts 116, 117 is fixed at a second ratio. If instead engaging the second dog ring 120 with a third gear set 122, the gear ratio from the planet carrier 114 to the output shafts 116, 117 is fixed at a third ratio. In each of these gear ratios between the planet carrier 114 and the gear shaft 116, 117 infinitely many gear ratios between the input shaft 108 and the output shafts 116, 117 may be realized by controlling the angular velocity of the ring gear 111 through varying the displacement volume of the variable displacement unit 100. Hereby the gearing range is selected by operating either the first dog ring 119 or the second dog ring 120, while the specific gear ratio within the range is set by operating the variable displacement unit 100 using the electro hydraulic actuator. The specific displacement set-point for the variable displacement unit 100 is generated electronically in the control modules, in response to external sensor signals such as the two speed sensors, or any other sensor(s) connected to the control modules.

If the displacement volume of the variable displacement unit 100 is zero the ring gear 111 does not rotate, and the power flow is from the rotating power unit 107 to the output shafts 116, 117 through the mechanical gearing only. If the displacement volume of the variable displacement unit 100 is selected so the sun gear 109 and the ring gear 111 rotate in the same angular direction, the power flow going from the rotating power unit 107 to the output shafts 116, 117 is split between the mechanical gearing and the hydraulic main circuit. The fixed displacement unit 106 then works as a motor and the variable displacement unit 100 works as a pump. If the volume displacement of the variable displacement unit 100 is selected so the sun gear 109 and the ring gear 111 rotate in opposite angular directions, power is regenerated back to the input shaft 108 through the hydraulic main circuit. The fixed displacement unit 106 hereby works as a pump and the variable displacement unit 100 works as a motor.

An auxiliary pad 123 may be used as an additional power output, for example for mounting a hydraulic gear pump or mechanically driving a tool such as a snow blower, a snow blade, a plough, a tilt bucket, a herbicide sprayer etc.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A control system for a hydraulic servomotor, the control system comprising:

an electro hydraulic actuator comprising a number of valves for controlling fluid and a main control module adapted to supply control signals to at least some of said valves, thereby controlling the fluid, and comprising one or more connectors for receiving and/or transmitting signals, at least one extension control module comprising one or more connectors for receiving and/or transmitting signals, and means for communicating signals between the main control module and each of the extension control module(s) via said connectors, wherein the main control module and the extension control module(s) form a master/slave configuration in which the main control module acts as master module and the extension control module(s) act(s) as slave module(s).

2. The control system according to claim 1, wherein at least one extension control module forms part of a second electro hydraulic actuator.

3. The control system according to claim 2, wherein the extension control module(s) forming part of a second electro hydraulic actuator is/are adapted to provide redundant control of the hydraulic servomotor.

4. The control system according to claim 1, wherein at least one extension control module is identical to the main control module.

5. The control system according to claim 1, wherein the means for communicating signals comprises a bus connection.

6. The control system according to claim 1, wherein the hydraulic servomotor comprises a cylinder and a double acting piston slidably mounted in the cylinder and defining a first chamber and a second chamber in the cylinder, said piston being slidably movable in a first direction in response to a supply of fluid to the first chamber, and in an opposite second direction in response to a supply of fluid to the second chamber, said fluid flows being controlled by means of the valves.

7. The control system according to claim 1, wherein the hydraulic actuator comprises four valves arranged in a bridge circuit, the hydraulic servomotor being arranged between diagonals of the bridge circuit.

8. The control system according to claim 7, wherein at least one of the valves is an electrically operable valve.

9. The control system according to claim 8, wherein at least one of the valves is normally closed in a de-energized state.

10. The control system according to claim 7, further comprising at least one additional valve arranged in parallel to one of the valves forming the bridge circuit.

11. The control system according to claim 7, further comprising at least four additional valves arranged in at least one additional bridge circuit, said additional bridge circuit being arranged in parallel with the first bridge circuit.

12. The control system according to claim 11, wherein the hydraulic actuator comprises at least one additional hydraulic servomotor being arranged between diagonals of a bridge circuit.

13. The control system according to claim 7, wherein at least one valve is driven by a pulse train signal.

14. The control system according to claim 7, wherein the valves are controlled by means of a closed loop control of the hydraulic servomotor.

15. The control system according to claim 14, further comprising at least one sensor, said sensor(s) being adapted to provide an input signal to the closed loop control.

16. Use of a control system according to claim 1 in a hydro-mechanical transmission (HMT).

17. Use of a control system according to claim 1 in an electro hydraulic steering application.

* * * * *